INVENTOR.
FRANK F. STARR.

June 10, 1941.　　　　F. F. STARR　　　　2,244,900
REFRIGERATING APPARATUS
Filed July 20, 1939　　　　2 Sheets—Sheet 2

INVENTOR.
FRANK F. STARR.
BY Spencer, Hardman and Fehr
HIS ATTORNEYS.

Patented June 10, 1941

2,244,900

UNITED STATES PATENT OFFICE 2,244,900

REFRIGERATING APPARATUS

Frank F. Starr, Dayton, Ohio, assignor to General Motors Corporation, Dayton, Ohio, a corporation of Delaware Application July 20, 1939, Serial No. 285,563

7 Claims. (Cl. 62—103)

This invention relates to refrigerating apparatus and particularly to household refrigerators.

It is an object of my invention to overcome certain defects encountered in the use of a multi-temperatured refrigerator cabinet in localities having excessively high relative humidities.

Another object of my invention is to provide a multi-temperatured refrigerator cabinet with means for preventing an abnormal accumulation of moisture or water within the high relative humidity food storage compartment thereof.

A further object of my invention is to provide a multi-temperatured refrigerator cabinet with means for exposing the air within a high relative humidity food storage compartment to the air and to an evaporator of a refrigerating system within a low temperatured food storage compartment thereof automatically in response to a predetermined accumulation of condensate water in the high relative humidity compartment.

A still further and more specific object of my invention is to provide a partition, which divides the interior of a refrigerator cabinet into normally isolated food storage compartments, with an automatically operated venting or shutter device for exposing the air within one of the compartments to the air and to an evaporator of a refrigerating system within another compartment to reduce the moisture content of the air within said another compartment.

Further objects and advantages of the present invention will be apparent from the following description, reference being had to the accompanying drawings, wherein a preferred form of the present invention is clearly shown.

Figures 1, 3:
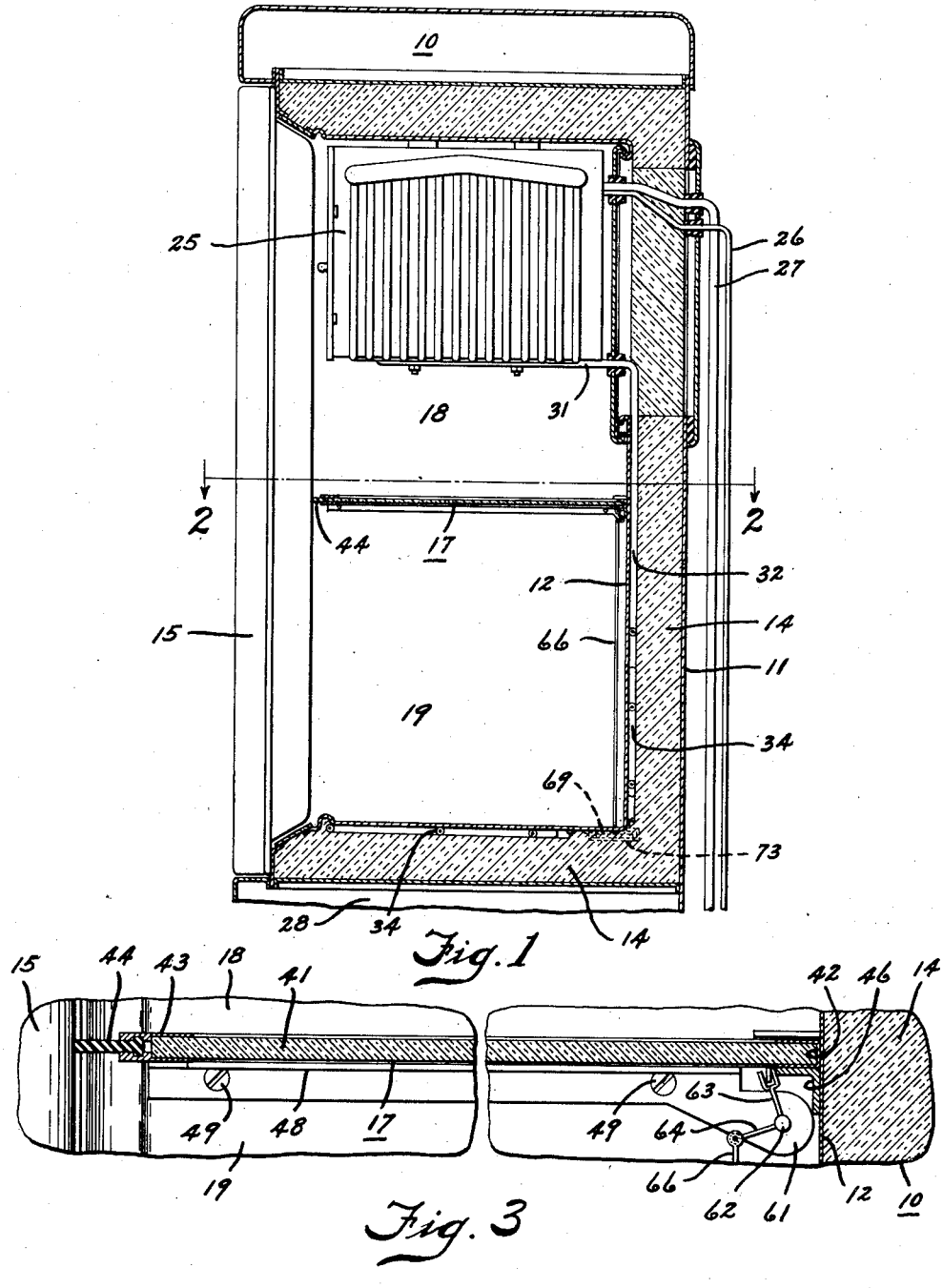
Fig. 1 is a vertical sectional view through a refrigerating apparatus having my invention embodied therein.
Fig. 3 is an enlarged fragmentary sectional view taken on the line 3—3 of Fig. 2 showing the partition employed in the refrigerating apparatus of my invention in detail.

In order to illustrate my invention I have shown in the drawings a multi-temperatured compartment household refrigerating apparatus of the type disclosed in the copending application of Ralph K. Miller, Serial No. 224,786, filed August 13, 1938. My invention is particularly applicable to an apparatus of the type disclosed in the copending application referred to and I may herein only briefly describe the construction of the refrigerating apparatus, since a more detailed description of the apparatus may be had by referring to the copending application identified. Referring now to the drawings, there is shown a household refrigerating apparatus comprising a cabinet 10 having sheet metal outer walls 11 and an inner box-like metal liner 12 with insulation 14 disposed therebetween. The line 12 forms a chamber within cabinet 10 and an opening therein provides access to the chamber and is normally closed by a door 15. A partitioning means, generally represented by the reference character 17, is disposed horizontally within the cabinet chamber and divides this chamber into an upper food storage compartment 18 and a lower food storage compartment 19. Partition 17 cooperates with the upright walls of cabinet chamber and the inner surface of the door 15 to form a seal between the compartments for normally isolating the compartments 18 and 19 from air circulation therebetween. The partition normally isolates the compartments 18 and 19 and provides a certain amount of insulation between the two compartments so that different temperatures as well as different humidities may be maintained in the different compartments.

In order to cool the upper food storage compartment 18 to a low temperature an evaporator 25, of any desirable construction or design and preferably of the sheet metal variety, is fastened to the top wall of the inner liner 12. This evaporator 25 is connected by conduits 26 and 27 to a refrigerant compressing and liquefying unit (not shown) usually mounted in a machine compartment 28 provided in cabinet 10 below the insulated food chamber thereof. Refrigerant supplied to evaporator 25 by the refrigerant translating unit is evaporated therein and removes heat from the upper compartment 18 in the well-known manner to cool this compartment to a predetermined low temperature. A closed secondary refrigerating system or circuit comprises a conduit portion 31 secured in intimate thermal contact with the bottom wall of evaporator 25 of the primary refrigerating system and forms a condensing portion for volatile refrigerant sealed within the secondary circuit. A conduit or conduits 32 connected to the condensing portion 31 of the secondary refrigerating system are also connected to a refrigerant evaporating conduit or portion 34 which has lobes or parts thereof extending over and secured, in any suitable manner, to portions of liner 12 forming walls of the lower food storage compartment 19. This secondary refrigerating system preferably operates at a higher temperature than the primary evaporator; and, as an example, if the primary evaporator is maintained at an average temperature of 20° F. it is desirable that this closed secondary refrigerant circuit operate at about 35° F. Following this example, the primary evaporator 25 normally operates below freezing temperatures and preferably at about 20° F. in order to freeze water, placed in trays and inserted into the evaporator, into ice cubes. This low average temperature of evaporator 25 tends to remove moisture from the air in compartment 18, which moisture collects on walls of the evaporator 25 in the form of frost or ice and, consequently, reduces the moisture content of the air in the compartment 18. By virtue of the partitioning means 17 and due to the large amount of cooling surface of the coils or conduit portions 34 of the closed secondary refrigerating system, with respect to the relatively small amount of condensing coils or portion 31 thereof, the secondary evaporator 34 normally cools walls of compartment 19 to a temperature of about 35° F. and maintains the air therein at a high relative humidity.

In operation of the apparatus refrigerant is circulated to and from the primary evaporator 25 by the refrigerant translating unit and cools and causes circulation of air within the upper food storage compartment 18. Refrigerant evaporated in the evaporating portion 34 of the secondary refrigerating system, upon withdrawing heat from the lower food compartment 19, flows through one of the conduits 32 to the condensing portion or conduit 31 of the secondary refrigerating system. Since conduit 31 is in intimate thermal contact with the bottom of primary evaporator 25, the low temperature of evaporator 25 causes the evaporated refrigerant in the conduit 31 to condense or liquefy, whereupon it returns through the other conduit 32 to the lower portion 34 of the secondary refrigerating system. Preferably, the secondary circuit is always maintained at a temperature above freezing while the primary evaporator operates below freezing in order to freeze water contained in trays within the evaporator 25 into ice blocks. Thus, with this arrangement, walls of the food compartment 19 are cooled to a temperature in the neighborhood of 36° F. while a much lower temperature is maintained within the upper compartment 18. This method of refrigeration together with the use of partition 17 affords a high relative humidity within compartment 19 for the cold storage of fruits and vegetables.

In the use of the apparatus thus far described, in certain climates no difficulty is encountered and the apparatus functions to maintain a predetermined high relative humidity in the food compartment 19. However, in other climates where the air is laden with moisture and is of high relative humidity, normal leakage of the air into the food storage compartment 19, or frequent opening and closing of the cabinet door 15, causes moisture to condense out of the air by the cooling of air within compartment 19 by the refrigerant evaporating portion 34 of the secondary refrigerating system. Moisture condensed out of the air within compartment 19 collects on the walls of the compartment and flows to the bottom thereof. This creates too moist a condition within the compartment 19 and impairs the proper cold storage preservation of foods therein. The moisture or water may also accumulate upon the bottom wall of compartment 19 to such a height that it will flow outwardly thereof at the compartment access opening. My invention is directed to the elimination of this over-moist condition within the high relative humidity food storage compartment 19 and to the prevention of overflow of water from the compartment. More specifically, my invention is directed to the maintenance of a normal substantially constant predetermined relative humidity within the high temperature food storage compartment 19 of the refrigerating apparatus disclosed irrespective of climatic conditions exteriorly of the refrigerator cabinet. For this reason, the partitioning means 17 in the present disclosure differs from the partition in the co-pending application heretofore referred to in that it is provided with a venting or shutter device or devices operated automatically in response to a predetermined accumulation of water within compartment 19 to permit communication of the air within compartment 19 with the air and with the primary evaporator 25 within compartment 18.

Figure 6:
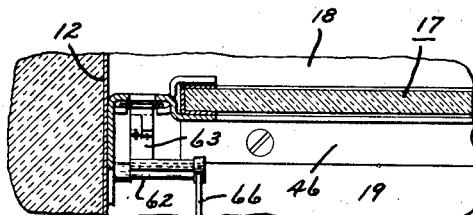
Fig. 6 is a fragmentary sectional view taken on the line 6—6 of Fig. 5 in a direction toward the back of the refrigerator.
Figure 6:
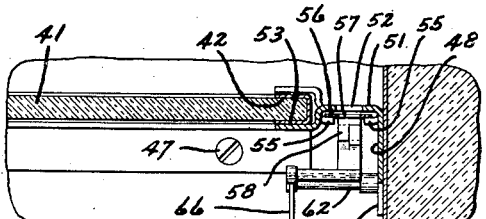
Figure 6:
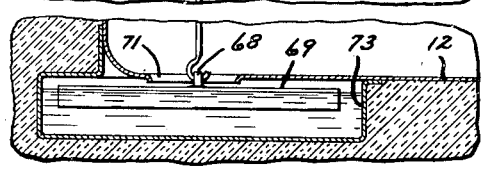

Referring again to the drawings, it will be noted that the partitioning means 17 includes a glass plate 41, providing visibility between the compartments 18 and 19, having a U-shaped metal member 42 clamped over the back and side edges thereof. At the front edge of plate 41 there is a metal member 43 which has a resilient rubber seal 44 secured thereto (see Fig. 3) and adapted to be engaged by the inner face of the cabinet door 15. An angle iron member 46 secured to the back wall of liner 12 by screws 47 (see Fig. 6) supports the partition 17 at the rear of the cabinet chamber. An angle iron member 48 is secured, as by screws 49, to each of the side walls of liner 12 and supports the partition 17 along its sides. Each member 48 includes a horizontal portion 51 provided with a plurality of openings 52 therein and also includes a downwardly bent and horizontally disposed part 53 providing a ledge upon which the sides of the partition plate 41 rest. The horizontal portions 51 of members 48 thus constitute a part of the partition 17 for isolating the food storage compartments 18 and 19 from one another. Each member 48 has downwardly bent and horizontally extending spaced apart ears 55 (see Figs. 4 and 6) located below the portion 51 thereof. These ears 55 support a horizontally disposed slide element 56 immediately below the openings 52 provided in the flat portion 51 of members 48. The slide element 56 is provided with a plurality of openings 57 along the length thereof and a downwardly bent or extended portion at its rear end. The ears 55 together with other parts of members 48 form a track-like opening or slot in which the slide element 56 is adapted to be reciprocated to align the openings 52 with the openings 57 or to close off communication between the food compartments 18 and 19. Since the operation or sliding of element 56 is preferably to be automatic, I provide an actuating mechanism therefor. Each bracket or member 48 includes a downwardly directed tail-like part 61 to which I mount, in any suitable or desirable manner, a shaft (not shown) that is surrounded by a member 62 having thereon arms 63 and 64. The one arm 63 of member 62 has its end portion split and bent outwardly to provide legs 65 which straddle the downwardly bent end portion 58 of slide 56. The other arm 64 of member 62 has its end portion bent around a pin which is secured to the upper end of a rod 66. The lower end of rod 66 is formed into a hook 67 which passes through an eyelet 68 secured to a float 69. Float 69 is preferably of light weight and can be constructed of two thin coiled metal pans secured together. Rod 66 is also of light weight and is preferably formed from aluminum material. The bottom wall of liner 12 is preferably inclined from the rear to the front of the cabinet, and I provide an opening 71 in the liner bottom wall at each rear corner of the lower food compartment 19 (see Fig. 6). Below the openings 71 I provide a water compartment or reservoir by welding or otherwise suitably securing metal compartment forming members 73 to the liner 12. The members 73 are disposed within the insulating space between liner 12 and the outer metal walls 11 of cabinet 10 and have the floats 69 located therein.

Figure 4:
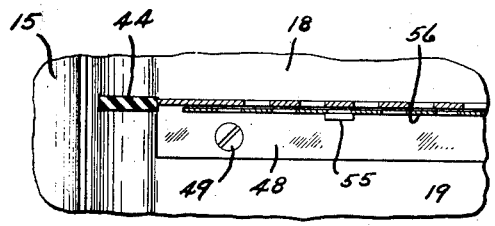
Fig. 4 is an enlarged fragmentary sectional view through the refrigerating apparatus taken on the line 4—4 of Fig. 2 showing a shutter device portion of the partition.
Figure 2:
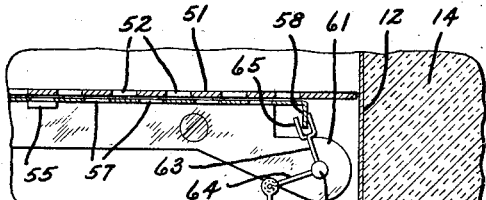
Fig. 2 is a horizontal sectional view of the apparatus shown in Fig. 1 and is taken on the line 2—2 thereof.
Figure 2:
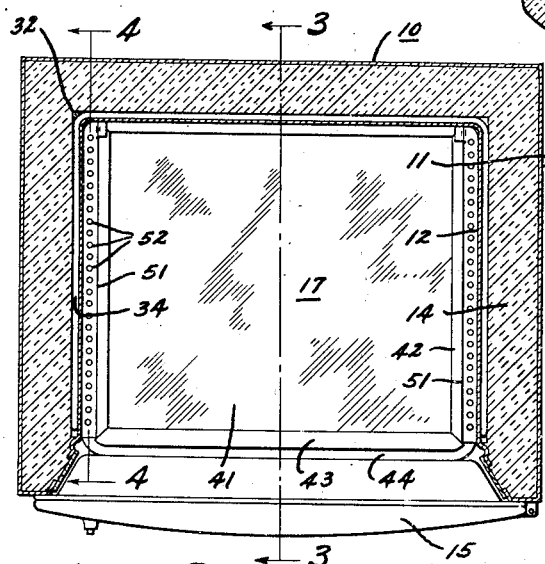
Figure 5:
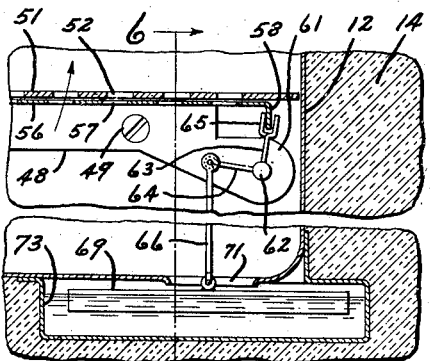
Fig. 5 is a view similar to Fig. 4 showing the shutter device in open position.

Upon starting operation of the refrigerating apparatus, the slide element 56 and its actuating mechanism of the shutter or fielding device, which is incorporated in the partition 17, are in a normally closed position as shown in Fig. 4 of the drawings. As refrigeration continues, moisture in the air within the high relative humidity food storage compartment 19 is condensed out of the air by the cooling effect produced by the refrigerant evaporating portion 34 of the secondary refrigerating system. The condensed moisture accumulates on walls of compartment 19 and flows to the bottom of liner 12 from where it travels through the openings 71 therein to the water reservoirs formed by the members 73. As the level of water rises within the reservoirs, the floats 69 will be elevated to move rods 66 upwardly. The upward movement of rods 66 causes members 62 to rotate about their mounting shafts to thus move the arms 63 and 64 of members 62. Since the U-shaped portions 65 of the one arm 63 of members 62 straddle the ends 58 of slides 56, these slides will be moved toward the rear of the cabinet as shown in Fig. 5 of the drawings. The openings 57 in the slides 56 will thus be brought into registration with the openings 52 in the parts 51 of the members 48 to permit the air within the lower food storage compartment 19 to communicate with the air and with the evaporator 25 within the upper food compartment 18. Since the air within the upper compartment 18 is colder and drier than the air within the lower compartment 19, this cold dry air will flow through the registering openings 52 and 57 of the shutter device into the lower compartment 19. This flow of air from compartment 18 to the lower compartment displaces the warmer moist air in compartment 19 and causes the moist air to flow upwardly through the openings 52 and 57 into the upper compartment 18. The evaporator 25, due to its low temperature, withdraws moisture from the moist air which moisture is deposited upon walls of the evaporator in the form of frost or ice. Thus, the moisture content of air within compartment 19 will be reduced and moisture will be taken up by the air from the body of water in the reservoirs. This will reduce the amount of water in the reservoirs and cause the level thereof to fall to thereby lower the floats 69 and rods 66 to actuate the shutter devices into closed position or into a position whereby the openings 52 and 57 no longer register with one another. In this manner the upper food compartment 18 is again isolated from the lower food compartment 19 to prevent air circulation therebetween until such time as a humidity which is detrimental to the proper storage of food in the lower compartment is reached, whereupon communication between the compartments will be automatically reestablished in the manner described. Thus, the apparatus is automatic in operation to main a predetermined average high relative humidity within the lower vegetable or fruit storage compartment 19 than in the colder upper compartment 18 of the refrigerator cabinet.

In view of the foregoing, it will be seen that I have provided an improved refrigerating apparatus of the type wherein separate food storage compartments are maintained at different temperatures and relative humidities with respect to one another for the storing of a variety of food products and wherein provision is made for preventing the occurrence of a too moist condition within the normal high relative humidity compartment. An apparatus having my invention embodied therein is rendered satisfactory for use in various localities of different climatic conditions since the operation of the venting or compartment communicating means is dependent upon a predetermined accumulation of water condensed out of the air within the normally high relative humidity food storage compartment. My invention insures that a proper relative humidity will be maintained within the high temperatured food storage compartment and eliminates any special attention to the refrigerating apparatus during periods of high relative humidity climatic conditions in the vicinity of the apparatus.

While the form of embodiment of the invention as herein disclosed, constitutes a preferred form, it is to be understood that other forms might be adopted, all coming within the scope of the claims which follow.

What is claimed is as follows:

1. In refrigerating apparatus, the combination of a structure defining first and second zones to be refrigerated, means for cooling the air in the first zone to a low temperature, means for cooling the air in the second zone to a temperature higher than the temperature of said first zone, and means responsive to the accumulation of a predetermined amount of condensation from the air in one of said zones for establishing communication between the zones.

2. In refrigerating apparatus, the combination of a structure defining first and second zones to be refrigerated, means for cooling the air in the first zone to a low temperature, means for cooling the air in the second zone to a temperature higher than the temperature of said first zone, normally closed means adapted to be opened to establish communication between said zones, a reservoir for receiving and collecting condensation from the air in said second zone, float means associated with said reservoir and operatively connected to said normally closed means, and said float means being movable upon the accumulation of a predetermined amount of water in said reservoir for opening said normally closed means.

3. In refrigerating apparatus, the combination of a structure defining first and second zones to be refrigerated, means for cooling the air in the first zone to a low temperature, means for cooling the air in the second zone to a temperature higher than the temperature of said first zone, normally closed means adapted to be opened to establish communication between said zones, and means operatively connected to said normally closed means and responsive to the accumulation of a predetermined amount of condensation from the air in said second zone for opening said normally closed means.

4. A refrigerating apparatus comprising in combination, a cabinet having a chamber therein, said chamber being provided with an access opening normally closed by a door, a partition disposed within said chamber and cooperating with walls thereof and with said door to divide the chamber into compartments and to substantially isolate said compartments from one another, means for cooling the air in one of said compartments to a low temperature, means for cooling the air in another of said compartments to a temperature higher than the temperature of said one compartment, said partition including normally closed means adapted to be opened to establish communication between said compartments, and means operatively connected to said normally closed means and responsive to the accumulation of a predetermined amount of condensation from the air in one of said compartments for opening said normally closed means.

5. A refrigerating apparatus comprising in combination, a cabinet having a chamber therein, said chamber being provided with an access opening normally closed by a door, a partition disposed within said chamber and cooperating with walls thereof and with said door to divide the chamber into compartments and to substantially isolate said compartments from one another, means for cooling the air in one of said compartments to a low temperature, means for cooling the air in another of said compartments to a temperature higher than the temperature of said one compartment, said partition including normally closed means adapted to be opened to establish communication between said compartments, a reservoir for receiving and collecting condensation from the air in said another compartment, float means associated with said reservoir and operatively connected to said normally closed means, and said float means being movable upon the accumulation of a predetermined amount of water in said reservoir for opening said normally closed means.

6. A refrigerating apparatus comprising in combination, a cabinet having a chamber therein, said chamber being provided with an access opening normally closed by a door, a horizontally disposed partition cooperating with walls of said chamber and with said door to divide the chamber into upper and lower food storage compartments and to substantially isolate said compartments from one another, means for cooling the air in said upper compartment to a low temperature, means for cooling the air in said lower compartment to a temperature higher than the temperature of said upper compartment, said partition including normally closed means adapted to be opened to establish communication between said compartments, and means operatively connected to said normally closed means and responsive to the accumulation of a predetermined amount of condensation from the air in said lower compartment for opening said normally closed means.

7. A refrigerating apparatus comprising in combination, a cabinet having a chamber therein, said chamber being provided with an access opening normally closed by a door, a horizontally disposed partition cooperating with walls of said chamber and with said door to divide the chamber into upper and lower food storage compartments and to substantially isolate said compartments from one another, means for cooling the air in said upper compartment to a low temperature, means for cooling the air in said lower compartment to a temperature higher than the temperature of said upper compartment, said partition including normally closed means adapted to be opened to establish communication between said compartments, a reservoir for receiving and collecting condensation from the air in said lower compartment, a float within said reservoir and operatively connected to said normally closed means, and said float being movable upon the accumulation of a predetermined amount of water in said reservoir for opening said normally closed means.

FRANK F. STARR.